United States Patent
Janesh et al.

(10) Patent No.: US 8,156,977 B2
(45) Date of Patent: Apr. 17, 2012

(54) TIRE

(75) Inventors: Joseph Thomas Janesh, Tallmadge, OH (US); Delwyn Lovell Harvey, North Canton, OH (US); Timothy Michael Rooney, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 693 days.

(21) Appl. No.: 12/335,604

(22) Filed: Dec. 16, 2008

(65) Prior Publication Data

US 2010/0147426 A1    Jun. 17, 2010

(51) Int. Cl.
*B60C 11/13* (2006.01)

(52) U.S. Cl. ......... 152/209.23; 152/209.18; 152/209.24; D12/512

(58) Field of Classification Search ............... D12/512, D12/147; 152/209.23, 209.18, 209.24
See application file for complete search history.

(56) References Cited

U.S. PATENT DOCUMENTS

| | | | |
|---|---|---|---|
| D326,075 S | 5/1992 | Covert et al. | D12/147 |
| D344,049 S | 2/1994 | Brown et al. | D12/147 |
| 5,658,404 A * | 8/1997 | Brown et al. | 152/209.8 |
| D388,038 S | 12/1997 | Ratliff, Jr. | D12/147 |
| D412,687 S | 8/1999 | Ratliff, Jr. | D12/147 |
| D428,838 S | 8/2000 | Maxwell | D12/149 |
| D549,156 S | 8/2007 | Umstot et al. | D12/579 |
| D568,233 S | 5/2008 | Dixon et al. | D12/512 |
| D578,954 S * | 10/2008 | Harvey et al. | D12/512 |

FOREIGN PATENT DOCUMENTS

| | | |
|---|---|---|
| DE | 8533453.7 | 2/1986 |
| EP | 729854 | 9/1996 |
| EP | 1106393 | 6/2001 |

OTHER PUBLICATIONS

Goodyear product sales page http://tires.productwiki.com/goodyear-wrangler-mt-r-with-kevlar/ found on Sep. 7, 2011.*
Goodyear product page http://www.goodyear.com/en-US/tires/wrangler-mtr-kevlar found on Sep. 7, 2011.*
Goodyear corporate History page, http://www.goodyear.com/corporate/history/history_byyear.html found on Sep. 7, 2011.*

* cited by examiner

*Primary Examiner* — Matthew Daniels
*Assistant Examiner* — Jacob Thomas Minskey
(74) *Attorney, Agent, or Firm* — Richard B. O'Planick

(57) ABSTRACT

A tire is configured having first and second shoulder rows of shoulder tread elements opposite respective first and second interior rows of interior tread elements, separated respectively by circumferentially extending, zig-zag shaped first and second grooves within a tire tread region. Each groove is defined by opposed shoulder tread elements and interior tread elements and includes a circumferentially continuous see-through central groove portion extending parallel to a circumferential centerplane of the tread. The see-through circumferential grooves communicate with angular intermediate and shoulder lateral grooves having a relatively wide mouth dimension adjacent to a respective circumferential grooves. Staggered in and out shoulder regions within the shoulder tread elements facilitate gripping edges and prevent mud clogging of the shoulder grooves.

16 Claims, 6 Drawing Sheets

TIRE

FIELD OF THE INVENTION

The invention relates generally to a tire and, more specifically, to a tire having a tread for improved off-road performance on muddy surfaces.

BACKGROUND OF THE INVENTION

Certain vehicle types such as SUV's and trucks are designed to be used on-road and off-road. In driving such vehicles off-road, muddy conditions may make traction difficult. In addition, the accumulation of mud in the tire tread may over time degrade the traction capability of the tire tread. It is, accordingly, desired that tires for off-road use maintain satisfactory performance under the myriad conditions encountered off-road, including mud.

SUMMARY OF THE INVENTION

According to one aspect of the invention, a tire is configured having within a tread region first and second shoulder rows of shoulder tread elements opposite respective first and second interior rows of interior tread elements, the first and second shoulder rows being separated from the first and second interior rows by circumferentially extending, zig-zag shaped first and second grooves, respectively. Each groove defined by opposed shoulder tread elements and interior tread elements, and the first and second grooves each having a circumferentially continuous see-through central groove portion extending parallel to a circumferential centerplane of the tread.

The shoulder tread elements and interior tread elements of the first shoulder row and the first interior row, according to another aspect, are each at least partially bounded by angled lateral sides extending to the first circumferential groove and circumferentially adjacent interior tread elements are separated by a funnel-shaped lateral interior groove defined by the angled sides of the adjacent interior tread elements.

In a further aspect, the see-through circumferential grooves communicate with angular intermediate and shoulder lateral grooves having a relatively wide mouth dimension at respective circumferential grooves. The shoulder blocks may further have staggered in and out shoulder regions at a respective tread edge to achieve gripping edges and prevent mud clogging of the shoulder grooves.

DEFINITIONS

"Aspect ratio" of the tire means the ratio of its section height (SH) to its section width (SW) multiplied by 100% for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Camber angle" means the angular tilt of the front wheels of a vehicle. Outwards at the top from perpendicular is positive camber; inwards at the top is negative camber.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip angle" means the angle of deviation between the plane of rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
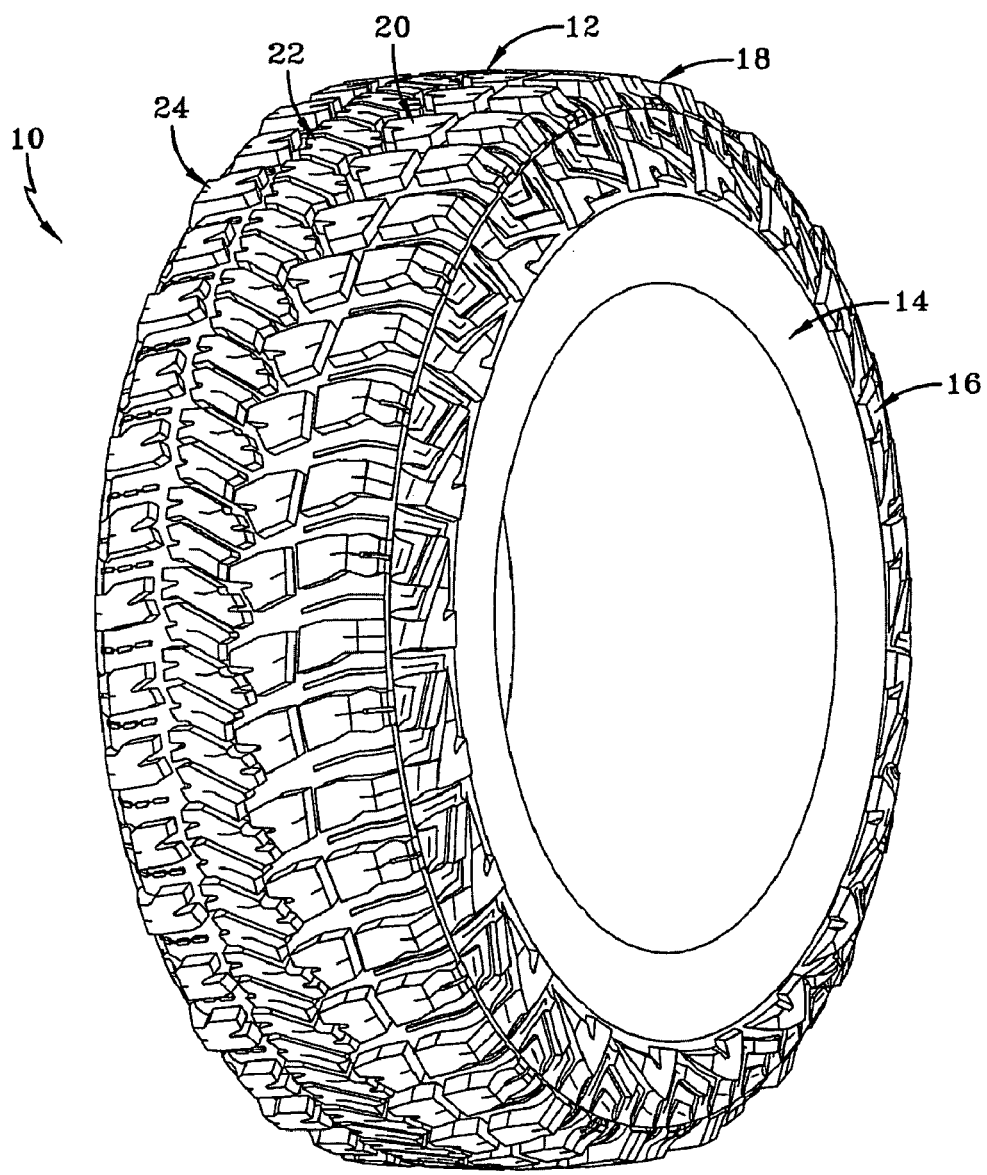
FIG. 1 is a perspective view of a tire including a tire tread.
Figure 2:
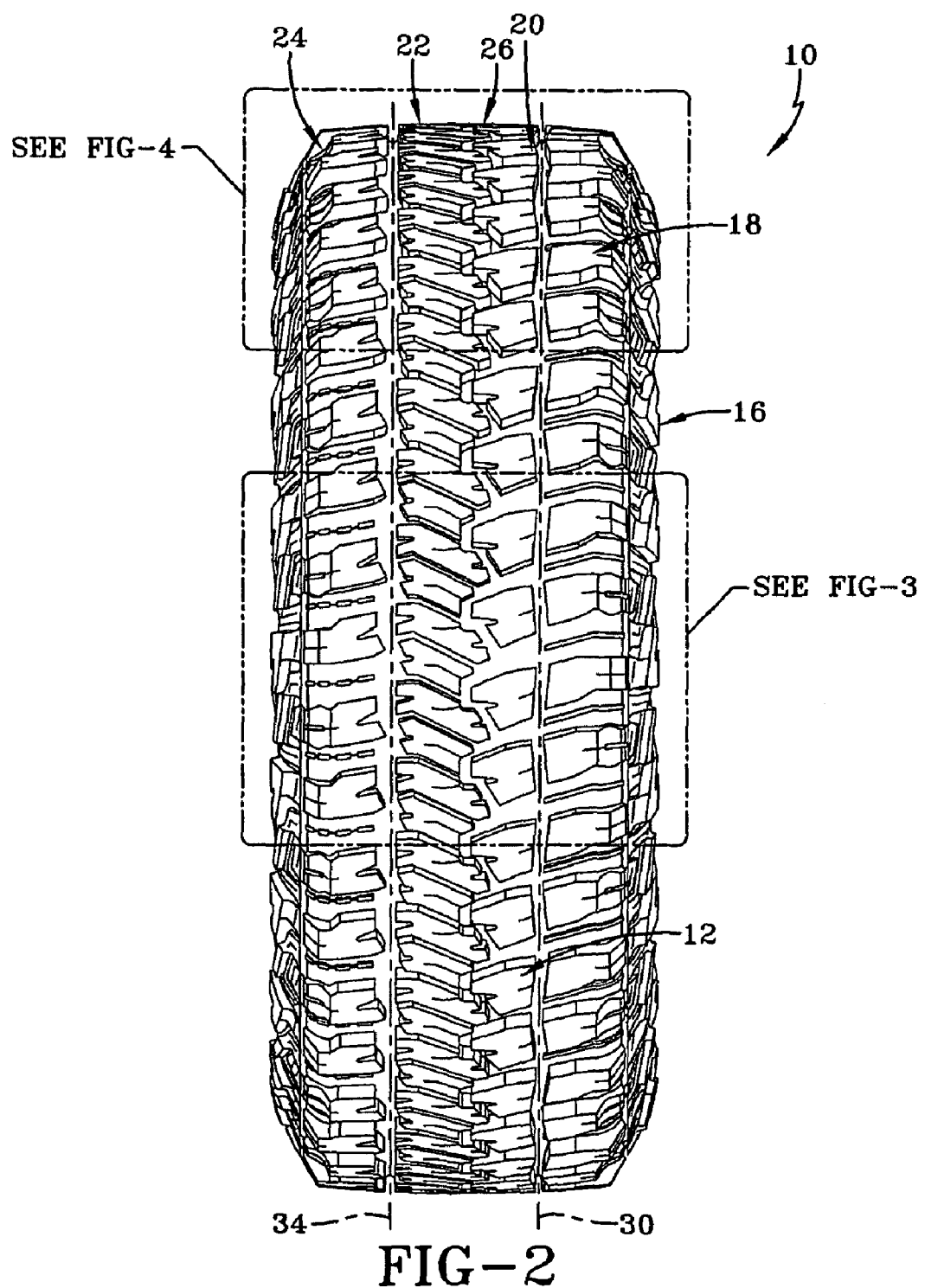
FIG. 2 is a front plan view of the tread.
Figure 3:
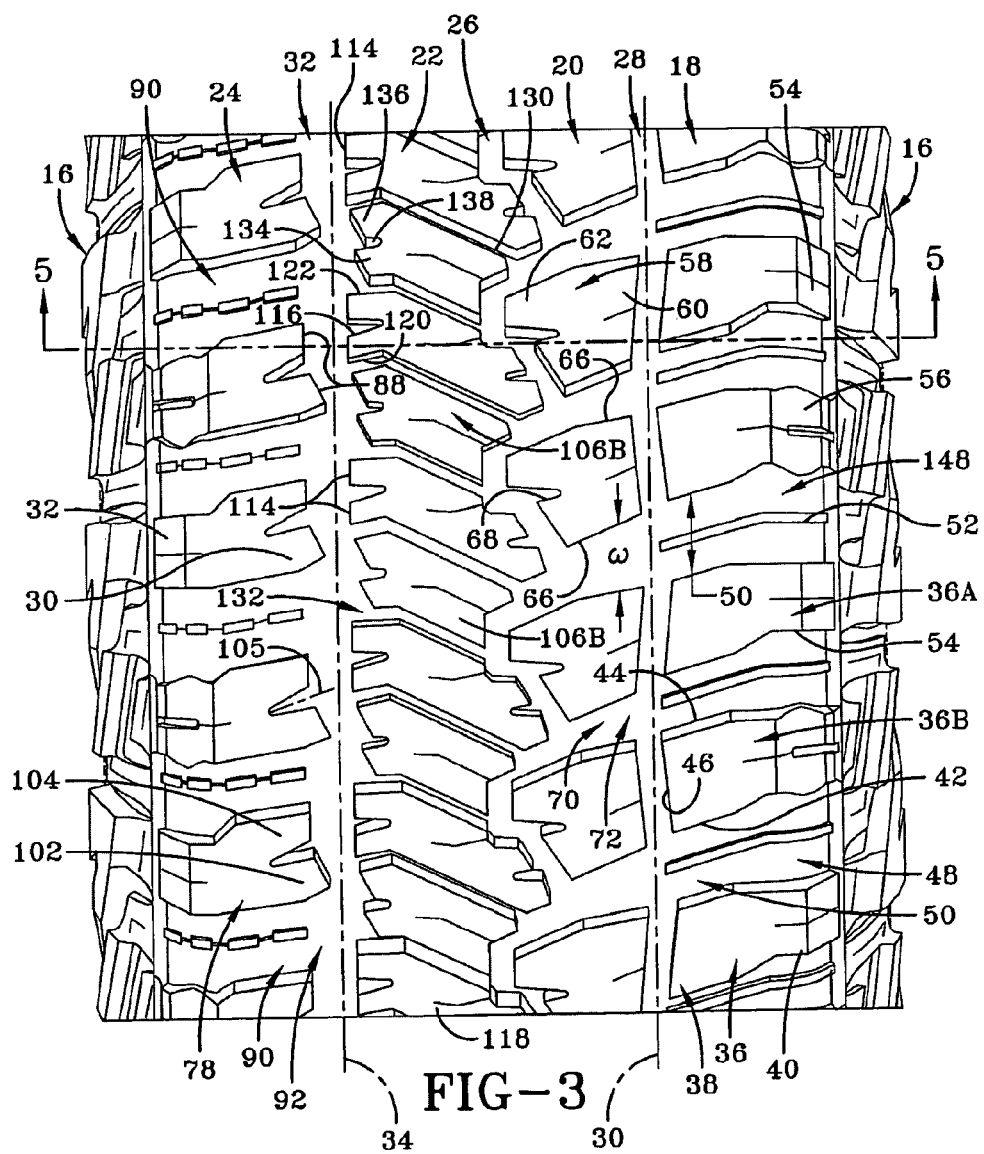
FIG. 3 is an enlarged front plan view of a portion of the tread.
Figure 4:
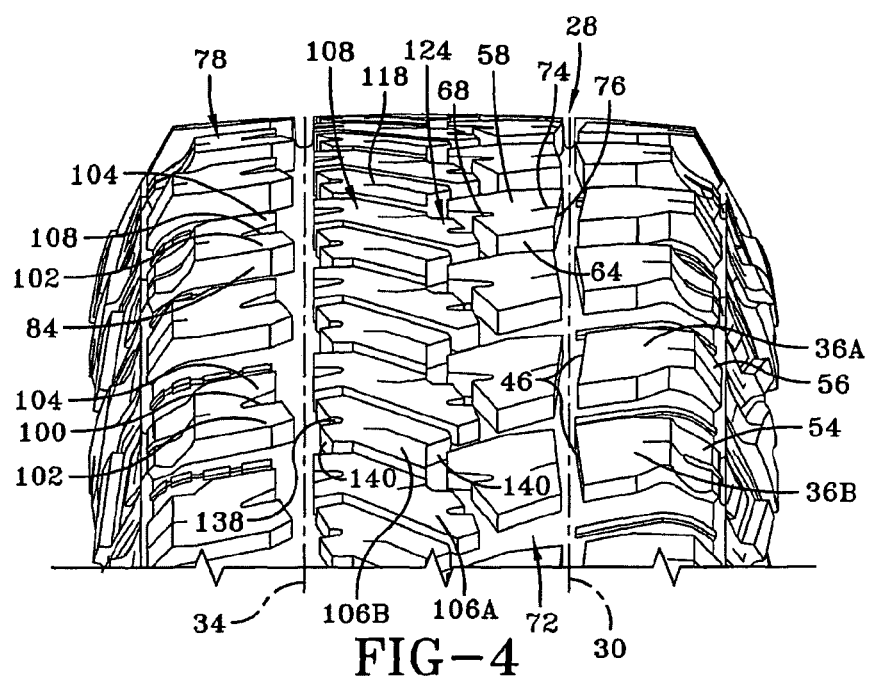
FIG. 4 is a perspective view of a portion of the tread.
Figure 5:
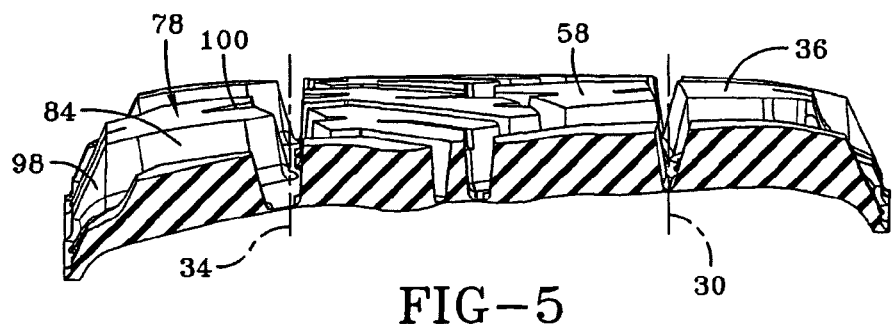
FIG. 5 is a cross-sectional view through the tread of FIG. 3, taken along the line 3-3.
Figure 6:
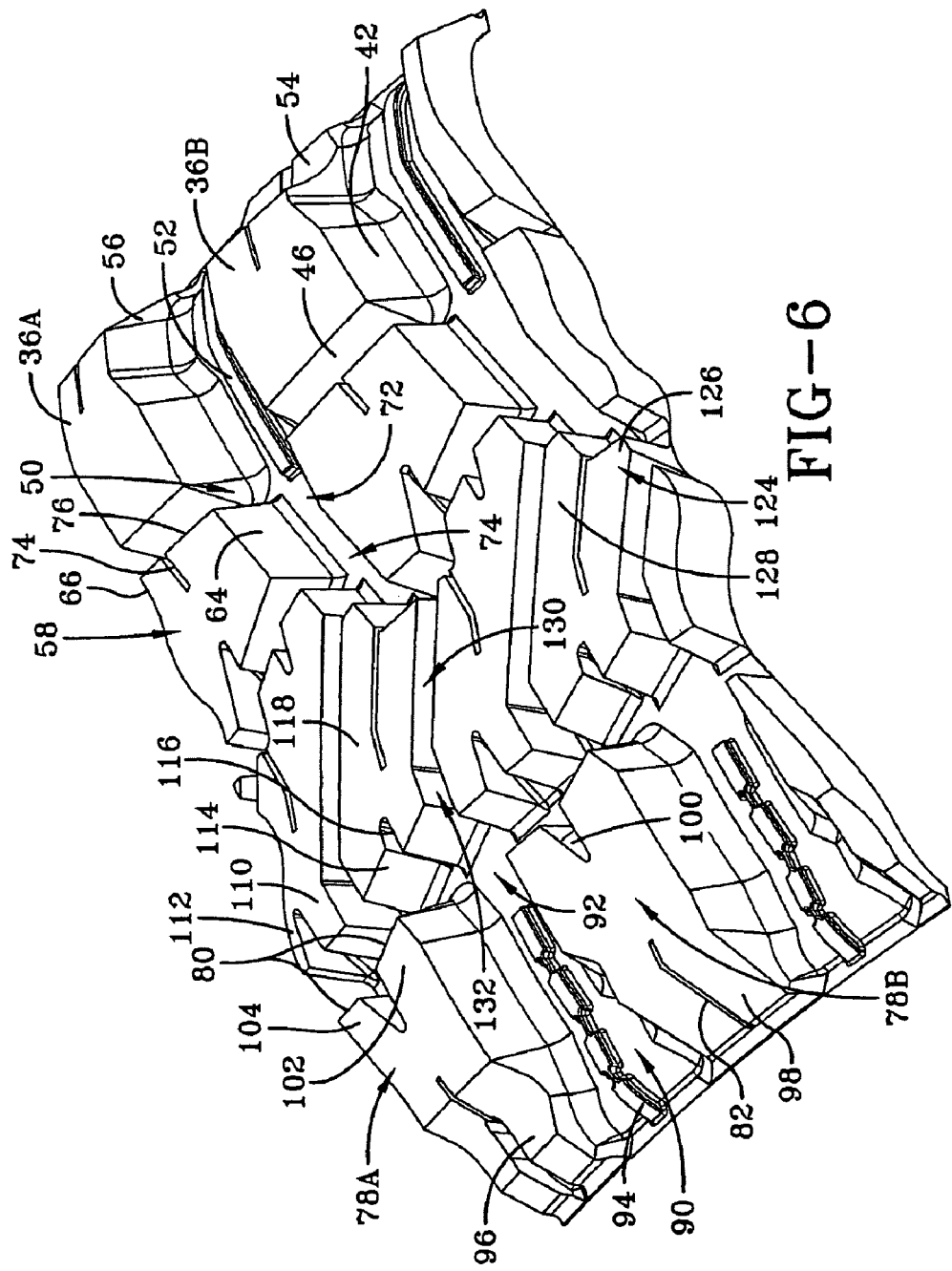
FIG. 6 is a left perspective view of a portion of the tread.
Figure 7:
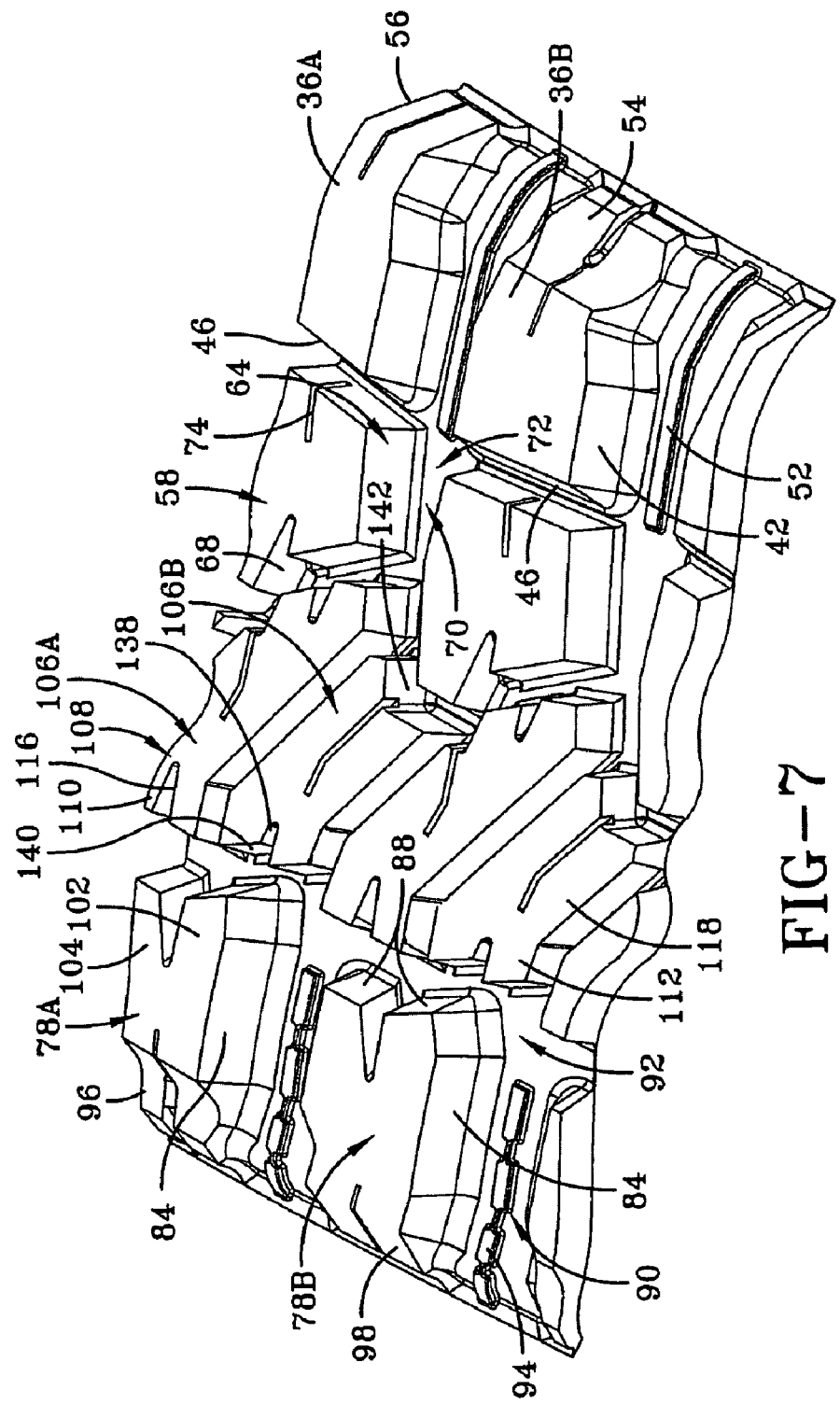
FIG. 7 is a top perspective view of a portion of the tread.

Referring to FIGS. 1 and 2, a tire 10 is shown having a circumferential tread 12 and a pair of sidewalls 14, each sidewall having an upper band of sidewall block elements. The tire 10 is of a type intended for use on myriad surfaces and under a range of surface conditions including mud. The off-road utility of the tire 10 makes performance in wet conditions important, especially mud performance. The tire tread 12 of the tire 10 therefore provides an off-road performance intended to maintain tire traction in various road conditions, particularly mud; and provides dynamic packing pressure relief for improved self-cleaning in muddy driving conditions. In addition, the tread 12 provides circumferential biting edges for mud steering capability. Moreover, as will be explained, the shoulder blocks alternate at the edges of the tread between in and out protruding configurations and contribute varied gripping edges for traction enhancement and also provide additional outlets to prevent mud clogging of shoulder grooves.

The tread 12 is constructed having first shoulder row 18 of tread elements or blocks 36; a first interior or center row 20 of block elements 58; a second interior row 22 of block elements 106; and a second shoulder row 24 of block elements 78. A zig-zag shaped circumferential center groove 26 extends between the interior rows 20, 22 and follows generally along an equatorial centerplane of the tire tread.

As best seen from FIGS. 3, 4, 5, 6, and 7, the first shoulder row 18 is separated from the first interior row 20 by a first circumferential groove 28. The groove 28 has a "see-through" center portion 30 that extends the circumference of the tread. Similarly, the tread 12 includes a second circumferential groove 32 at the opposite side of the tread, the groove 32 separating the second shoulder row 24 from the second interior row 22. By the term "see-through", it is meant that a continuous unobstructed circumferential central path exists, represented by broken line in the drawings, and runs coextensively within respective grooves 28, 32. The see-through center groove portions 30, 34 operate to provide dynamic packing pressure relief within the tread for enhanced self-cleaning. Moreover, the edges of the block elements within tread rows 18, 20, 22, 24 defining the outer boundaries of grooves 28, 32 provide enhanced "biting" for increased steering capability in mud.

The first shoulder row 18 includes a circumferential array of spaced apart block elements 36. Adjacent block elements 36A and 36B alternate within the array. Each block element 36A and 36B has an axially inward wedge-shaped portion 38 that merges with an axially outward portion 40 that extends to an outer edge of the tread 12. Each block portion 38 is defined by angled opposite sides 42, 44 and an axially inward end wall 46 positioned at the circumferential groove 28. The block elements 36A and 36B are spaced apart within the array by a lateral groove 48 having a groove mouth 48 opening to the groove 28. A stone ejecting rib 52 is medially positioned to extend along a bottom surface of each lateral groove 48. The sides 42, 44 of each shoulder block 36A and 36B incline from the groove 28 toward the axially outward edge of the tread 12 at an angle within the range of 12 to 23 degrees. The inward end surfaces 46 of each block 36A and 36B are angled at a common angle of inclination but in opposite directions with respect to the equatorial centerplane of the tread. The end walls 46 of the blocks incline preferably at an angle within the range of 82 to 98 degrees (−8 to 8 from the centerplane).

The blocks 36A and 36B are further differentiated in that blocks 36A have an outward planar shoulder 54 while the blocks 36B have an inwardly concave shoulder portion 56 along the outer tread edge. The staggered in and out surfaces of the blocks 36A and 36B create gripping edges to provide traction and also provide outlets to prevent mud clogging of the lateral shoulder grooves 48.

The first interior row 18 includes a circumferential array of spaced apart block elements 58. Each block element 58 has an axially outward positioned wedge portion 60 and a forked axially inward portion 62. The block element 58 is bounded along the wedge portion 60 by sides 64, 66 that incline toward the first circumferential groove 28 at an angle lying within the range of 7 to 31 degrees. A blind tapered slot 68 extends into the inward portion 62 of each block element 58. The array of block elements 58 are separated by a lateral groove 70 having a mouth portion 72 opening to the circumferential groove 28. A blind sipe 74 extends into an end wall 76 of each block element 58 as shown. The end wall 76 of adjacent block elements 58 within the first interior row 20 are angled in opposite directions with respect to the circumferential centerplane of the tire, the angle lying within a preferred range of 82 to 98 degrees (−8 to 8 from the centerplane). The end walls 76 of block elements 58 align opposite to and parallel with a respective end wall 46 of the first shoulder row block elements 36 along the groove 28. The alternating inclination angles and length of end walls 76 within the array of block elements in row 20 correspond with the alternating inclination angle and length of end walls 46 of the shoulder block elements 36. As a result, the end walls 46, 76 give the circumferential groove 28 a zig-zag shape. The central, see-though portion 30 of the groove 28, however, extends linearly within the groove 28.

It will be appreciated that the angular incline of the lateral grooves 70 align with the angular incline of the grooves 48. The angle of groove inclination is within a preferred range of 12 to 23 degrees. The mouth portions 72, 50 of the grooves 70, 48, respectively, align in opposition. The mouth portion 72 has a preferred width of 18 to 49 millimeters and the mouth portion 50 of the groove 48 has a preferred width within the range of 21 to 54 millimeters. The combination of shoulder and interior groove angles and (relatively large) widths of the grooves 70, 48, in combination with the see-through circumferential grooves 28, 32, reduces mud packing pressures, making the tread 12 relatively self-cleaning. Mud clogging within the grooves is reduced and improved mud traction and mud steering capability results.

The second shoulder row 24 includes a circumferential array of spaced apart block elements 78, each block element having a forked axially inward block portion 80 and an axially outward portion 82. The forked block portion is bounded by inclined sides 84, 86 terminating at a V-shaped end wall 88 adjacent the circumferential groove 32. The block elements are spaced apart by inclined lateral grooves 90 that have a groove mouth portion 92 communicating with the groove 32. A linearly aligned series of stone ejector protrusions 94 extend along a mid-region of each lateral groove 90. Within the row 24, alternating block elements 78 have an inwardly formed shoulder region 96 and a planar formed shoulder region 98, respectively. The edges defining the regions 96, 98 are thus radially offset and provide gripping edges for enhanced traction in muddy surface conditions. An inwardly tapering slot groove 100 separate first and second tine portions 102, 104 of the forked inward block portion 80. The tine portion 104 of each block 78 has an end wall 88 generally parallel to the groove 32 and the tine portion 102 has an end wall 88 that is angled at an angle of inclination within the range of 16 to 34 degrees with respect to the centerplane of the tread 12. The tin portions 102, 104 generally have the same length and form an angle to a centerline 105 of each slot 100 within a range of 12 to 30 degrees.

The second intermediate or interior row 22 includes a circumferential array of alternating spaced apart block elements 106A and 106B. Each block element 106A has an axially outward forked portion 108 and a forked axially inward portion 124. The block element forked portion 108 is configured by tine block portions 110, 112 terminating at an end wall 114. The forked portion 108 is bounded by sides 120, 122. A blind tapered slot 116 extends into the inward portion 108 of each block element 106A dividing tine portions 110, 112. The alternating block elements 106A, 106B are separated by a lateral groove 130 having a mouth portion 130 opening to the circumferential groove 32. The end wall 114 of the tine blocks 110, 112 is generally parallel to the groove 32 and the block portions 110, 112 are generally of the same length. The inward forked portion 124 of the blocks 106A include tine block portions 126, 128.

Each of the block elements 106 B has an axially outward forked portion defined by tine block portions 134, 136 separated by a tapered slot 138. The tine block portions 134, 136 terminate at an end wall that is angles at an angle within a range of 17 to 33 degrees with respect to the tread centerplane. At the axially inward portion of each block 106B is a notch 142.

It will be appreciated that the intermediate and shoulder lateral grooves 48, 70, 90, 130 are angled at an angle of inclination within a range of 12 to 23 degrees for groove 48; 13 to 24 degrees for the groove 70; 0 to 16 for the groove 90; and −21 to 37 degrees for the groove 130. Moreover, the width of the mouth portions of the lateral grooves at the respective circumferential groove 28, 32 for each is nominally within a range of 21 to 54 millimeters for groove 48; 18 to 49 millimeters for groove 70; 24 to 56 millimeters for the groove 90; and 3 to 14 millimeters for groove 130. This combination of lateral groove angle and width reduces mud packing pressures within the tread and produces a treaded tire having better self-cleaning and reduced mud clogging. Improved mud traction and mud steering capability also results.

The inclusion of see-through groove portions in combination with the aforementioned groove angle and width further enhances dynamic packing pressure relief for improved self-cleaning. In addition, the zig-zag outer shape of the circumferential grooves 28, 32 provides circumferential biting edges for increased mud steering capability while maintaining the see-through central path within each groove for packing pressure relief and self-cleaning enhancement. Also assisting in the performance of the tire on a muddy surface is the staggered in-out shoulder block configuration at both tread edges. This shoulder configuration provides varied gripping edges and also provides additional outlets for mud channeling in order to prevent mud clogging of the shoulder grooves.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire comprising: first and second shoulder rows of shoulder tread elements opposite respective first and second interior rows of interior tread elements within a tire tread region, the first and second shoulder rows being separated from the first and second interior rows by circumferentially extending, substantially zig-zag shaped first and second circumferential grooves, respectively, each circumferential groove defined by opposed shoulder tread elements and interior tread elements, and the first and second circumferential grooves each having a circumferentially continuous see-through central groove portion extending parallel to a circumferential centerplane of the tread; the shoulder tread elements and interior tread elements of the first shoulder row and the first interior row each being at least partially bounded by angled lateral sides extending to the first circumferential groove, and wherein circumferentially adjacent interior tread elements being separated by a funnel-shaped lateral interior groove defined by the angled sides of the adjacent interior tread elements; and each funnel shaped lateral groove having a mouth portion at the first circumferential groove and a groove segment extending axially inward beyond the first interior row toward a central region of the tread; and wherein the shoulder tread elements and interior tread elements of the second shoulder row and second interior row are circumferentially staggered and at least partially bounded by angled lateral sides extending to the second circumferential groove, and wherein circumferentially adjacent shoulder tread elements of the second shoulder row are separated by a funnel-shaped lateral shoulder groove defined by the angled sides of the adjacent second row shoulder elements.

2. The tire of claim 1, wherein circumferentially adjacent shoulder tread elements in the first shoulder row are separated by a lateral spacing groove defined by the angled sides of the adjacent shoulder tread elements.

3. The tire of claim 2, wherein each spacing groove extends at one end to an edge of the tread and includes a groove mouth portion substantially aligned at the first circumferential groove opposite to a respective lateral interior groove of the first interior row.

4. The tire of claim 3, wherein the groove mouth portions of the lateral interior grooves having a circumferential width dimension within a range of 16 to 49 millimeters.

5. The tire of claim 4, wherein the groove mouth portions of the spacing grooves having a circumferential width dimension within a range of 21 to 54 millimeters.

6. The tire of claim 5, wherein the lateral grooves and the spacing grooves having a substantially common angle of inclination within a range of 7 to 31 degrees with respect to an axial direction of the tire.

7. The tire of claim 1, wherein each shoulder tread element of the first shoulder row aligns opposite and forms an aligned pair with a corresponding interior tread element of the first interior row, each shoulder tread element and corresponding interior tread element within each said aligned pair having opposed parallel end surfaces that extend at a common angle with respect to an equatorial tread centerplane.

8. The tire of claim 7, wherein the common angle of the end surfaces is within a range of 82 to 98 degrees (−8 to 8 from the centerplane).

9. The tire of claim 8, wherein alternating end surfaces of the first shoulder row and the first interior row tread elements are angled in opposite directions at said common angle.

10. The tire of claim 1, wherein each lateral shoulder groove includes a groove mouth portion communicating with the second circumferential groove, the groove mouth portion having a circumferential width dimension within a range of 24 to 56 millimeters.

11. The tire of claim 1, wherein circumferentially adjacent interior tread elements of the second interior row are separated by a lateral spacing groove extending in an axial direction from a central region of the tread to the second circumferential groove.

12. The tire of claim 10, wherein the shoulder tread elements of the second shoulder row and the interior tread elements of the second interior row each include a forked block portion adjacent the second circumferential groove, each forked block portion comprising a first tine block and a second tine block separated by a tapered blind groove, and each first and second tine block having an angled end surface facing the second circumferential groove.

13. The tire of claim 12, wherein the end surface of the first tine block and the second tine block of each forked portion angle in an opposite direction at respective angles of inclination within the range of −3 to 3 degrees and 16 to 34 degrees.

14. The tire of claim 13, wherein the first tine block and the second tine block of each forked portion are substantially equal in length.

15. A tire comprising: first and second shoulder rows of shoulder tread elements opposite respective first and second interior rows of interior tread elements within a tire tread region, the first and second shoulder rows being separated from the first and second interior rows by circumferentially extending, substantially zig-zag shaped first and second grooves, respectively, each groove defined by opposed shoulder tread elements and interior tread elements, and the first and second grooves each having a circumferentially continuous see-through central groove portion extending parallel to a circumferential centerplane of the tread; the tread elements of each shoulder row alternately having outwardly and inwardly formed shoulder regions adjacent to a respective tread edge; and the tread elements of the first shoulder row being separated by an inclined groove having a groove mouth portion at the first circumferential groove dimensioned in width between 21 and 54 millimeters and the tread elements of the first interior row being separated by an inclined groove having a groove mouth portion at the first circumferential groove dimensioned in width between 18 and 49 millimeters; and wherein the shoulder tread elements and interior tread elements of the second shoulder row and second interior row are circumferentially staggered and at least partially bounded by angled lateral sides extending to the second circumferential groove, and wherein circumferentially adjacent shoulder tread elements of the second shoulder row are separated by a funnel-shaped lateral shoulder groove defined by the angled sides of the adjacent second row shoulder elements.

16. The tire of claim 15, wherein the tread elements of the second shoulder row are separated by an inclined groove having a groove mouth portion at the second circumferential groove dimensioned in width between 24 and 56 millimeters.

* * * * *